United States Patent [19]

Steensma et al.

[11] 4,077,701
[45] Mar. 7, 1978

[54] METHOD AND ARRANGEMENTS FOR DISPERSION EQUALIZATION OF OPTICAL FIBER TRANSMISSION LINES

[75] Inventors: Peter Dennis Steensma, Midland Park, N.J.; Charles Kuen Kao, Roanoke, Va.

[73] Assignee: International Telephone and Telegraph Corporation, Nutley, N.J.

[21] Appl. No.: 692,063

[22] Filed: Jun. 2, 1976

[51] Int. Cl.² ............................ G02B 5/14; G02F 1/11
[52] U.S. Cl. .............................. 350/96.23; 350/96.30
[58] Field of Search .......... 350/96 WG, 96 C, 160 R, 350/161 R; 331/94.5 T, 94.5 C, 94.5 M

[56] References Cited
U.S. PATENT DOCUMENTS

| | | | |
|---|---|---|---|
| 3,675,154 | 7/1972 | Duguay et al. | 331/94.5 T |
| 3,759,590 | 9/1973 | Arnaud | 350/96 WG |
| 3,774,121 | 11/1973 | Ashkin et al. | 350/160 R |
| 3,832,030 | 8/1974 | Gloge | 350/96 WG |

*Primary Examiner*—John K. Corbin
*Assistant Examiner*—Stewart Levy
*Attorney, Agent, or Firm*—John T. O'Halloran; Alfred C. Hill

[57] ABSTRACT

The dispersion effects in an optical fiber transmission line are equalized by producing a predetermined delay characteristic for each wavelength of an optical beam having a finite bandwidth which is the inverse of a given delay characteristic for each optical wavelength propagated through the transmission line. This is accomplished by launching shorter wavelength components of the optical beam at low angles with respect to the axis of the transmission line into the transmission line and launching longer wavelength components at high angles with respect to the axis of the transmission line into the transmission line. Two arrangements are disclosed to accomplish the above-mentioned launching technique. One arrangement includes a time of flight dependent annularly ruled transmission grating and the other arrangement includes passing a time of flight dependent moving acoustic wave through the optical beam.

26 Claims, 5 Drawing Figures

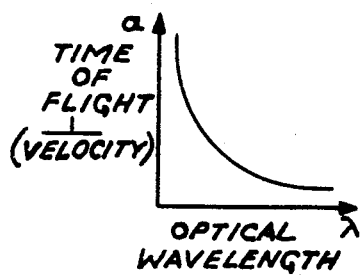
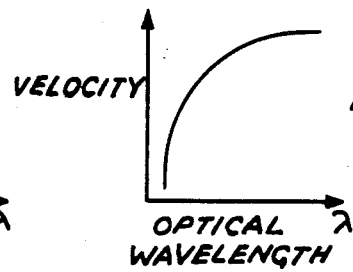
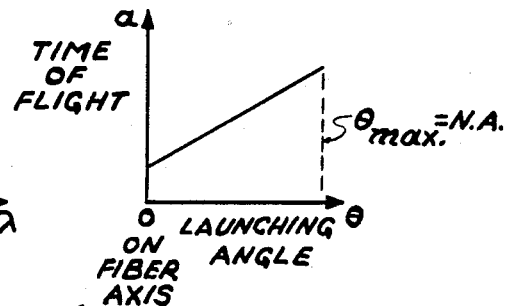
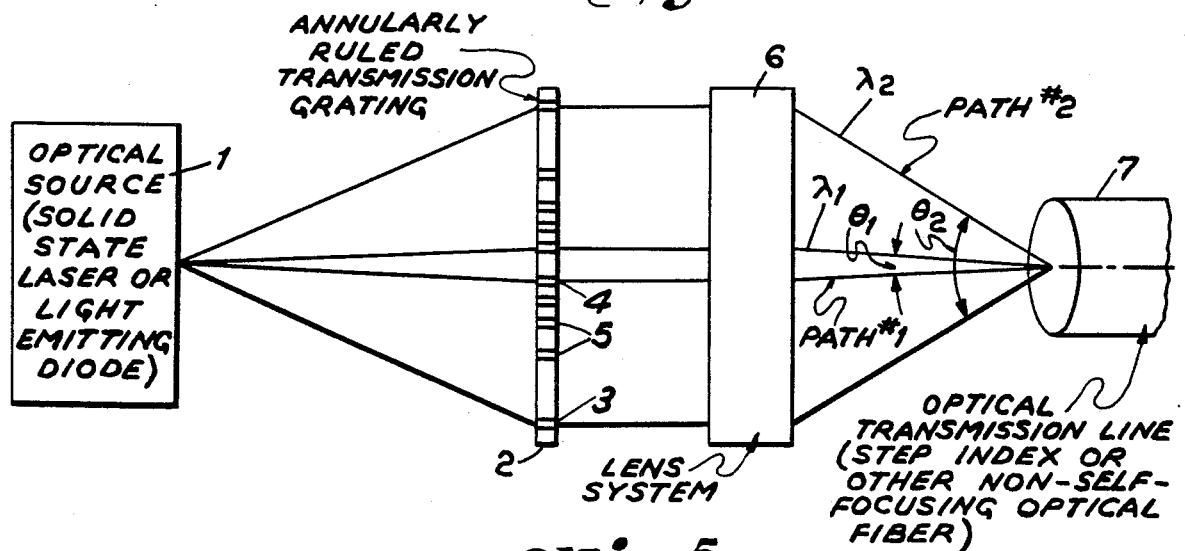
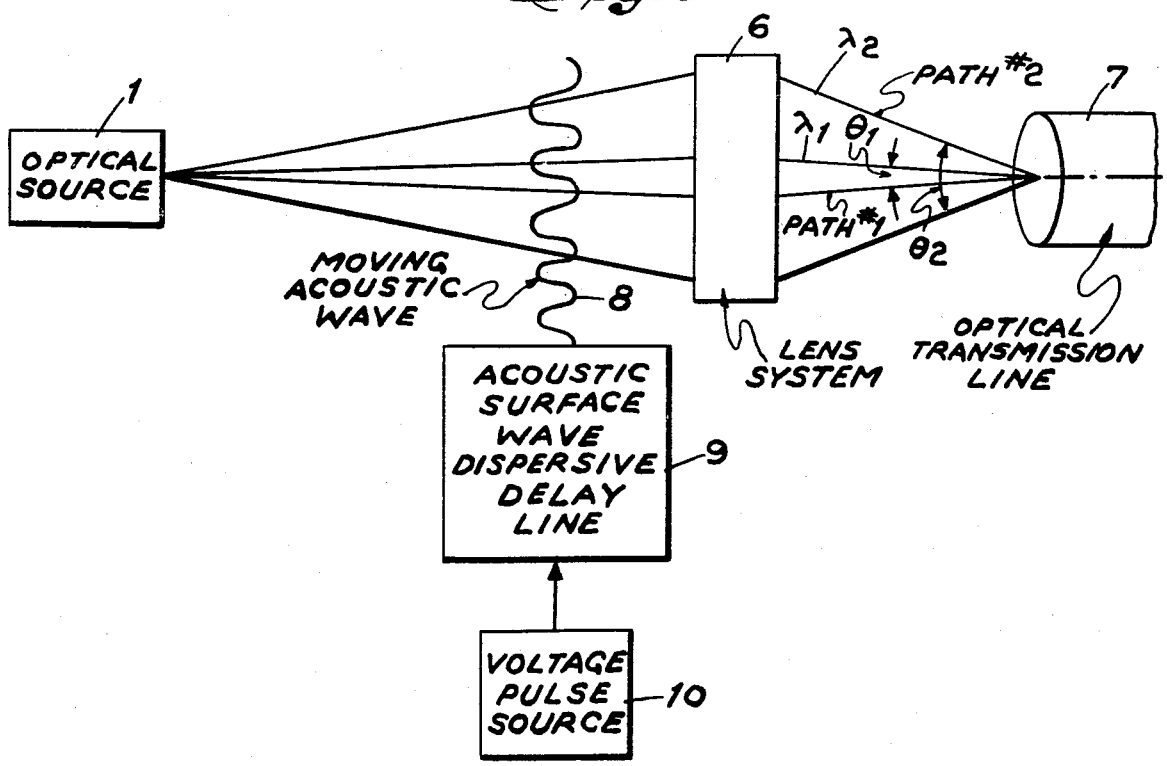

METHOD AND ARRANGEMENTS FOR DISPERSION EQUALIZATION OF OPTICAL FIBER TRANSMISSION LINES

BACKGROUND OF THE INVENTION

This invention relates to optical fiber transmission lines.

Bandwidth limitations of optical fiber transmission lines or waveguides arise from material index of refraction dependence on optical frequency and time of flight dependence on the launching angle of an optical ray into an optical fiber transmission line. That is, the optical fiber transmission lines have a given delay characteristic for each optical wavelength propagated therethrough so that the optical wavelengths do not appear at the output of the transmission lines at the same time.

SUMMARY OF THE INVENTION

An object of the present invention is to provide a method and arrangements for eliminating or reducing dispersion effects of optical fiber transmission lines due either to material index of refraction or multimode delays or both.

A feature of the present invention is the provision of a method of equalizing dispersion effects in an optical fiber transmission line having a given delay characteristic for each optical wavelength propagated therethrough comprising the step of: producing a predetermined delay characteristic for each wavelength of an optical beam having a finite bandwidth which are the inverse to the given delay characteristics of the transmission line.

Another feature of the present invention is the provision of an arrangement for equalizing dispersion effects in an optical fiber transmission line comprising; first means for producing an optical beam having a finite bandwidth; and second means optically coupled to the first means to launch shorter wavelength components of the beam at low angles with respect to the axis of the transmission line into the transmission line and to launch longer wavelength components of the beam at high angles with respect to the axis of the transmission line into the transmission line.

BRIEF DESCRIPTION OF THE DRAWING

Above-mentioned and other features and objects of this invention will become more apparent by reference to the following description taken in conjunction with the accompanying drawing, in which:

FIGS. 1, 2 and 3 are graphs useful in explaining the theory of operation of equalizing dispersive effects of an optical fiber transmission line in accordance with the principles of the present invention;

FIG. 4 is a schematic diagram in block form of one arrangement for carrying out the method of equalizing dispersive effects of an optical fiber transmission line in accordance with the principles of the present invention; and FIG. 5 is a schematic diagram in block form of a second embodiment of an arrangement for carrying out the method of equalizing dispersive effects of an optical fiber transmission line in accordance with the principles of the present invention.

DESCRIPTION OF THE PREFERRED EMBODIMENTS

In accordance with the principles of the present invention the method of equalizing (eliminating or reducing) dispersion effects in an optical fiber transmission line having a given delay characteristic for each optical wavelength propagated therethrough comprises the step of producing a predetermined delay characteristic for each wavelength of an optical beam having a finite bandwidth which are the inverse of the given delay characteristics of the transmission line. The step of producing is accomplished by launching shorter wavelength components of the optical beam at low angles with respect to the axis of the transmission line into the transmission line and launching longer wavelength components at high angles with respect to the axis of the transmission line into the transmission line.

The graph of FIG. 1 illustrates the time of flight versus optical wavelength when the source of wavelength is passed through bulk quartz forming an optical fiber transmission line. FIG. 2 is a graph of the velocity of an optical ray versus the optical wavelength of the ray when passed through the same type of optical fiber transmission line. The graph of FIG. 3 shows the time of flight of an optical pulse of a particular wavelength optical ray versus the launching angle $\theta$ with respect to the axis of a step index or other non-self-focusing optical fiber transmission line. As illustrated in FIG. 3, there is a maximum angle of $\theta$ for the launching angle which is equal to N.A., where N.A. is an abbreviation for the numerical aperture of the optical fiber transmission line which is defined as the sine of the maximum ray angle that the optical fiber transmission line can accept.

The approximate magnitude of the time of flight spread due to wavelength variation is 4 nanoseconds per kilometer of the material of the optical fiber transmission line for an optical beam having a 200 A (angstrom) bandwidth.

As mentioned hereinabove, the technique for equalizing the dispersion effects of an optical fiber transmission line is to launch the shorter wavelength components of the optical beam at low angles with respect to the axis of the transmission line into the transmission line and to launch the longer wavelengths of the optical beam at high angles with respect to the axis of the transmission line into the transmission line, and the time differential during which these two events occur is of an appropriate ratio given by the following formula: $\lambda(t_e)$ & $\theta(t_e)$ vary so that $$\frac{1}{c} \frac{\eta[\lambda(t_e)]}{\cos[\theta(t_e)]} - t_e = \text{constant for all } t_e,$$

where $t_e$ = time of launching
$l$ = length of fiber
$c$ = velocity of light in vacuo
$\eta(\lambda)$ = variation of refractive index with $\lambda$
$\lambda$ = optical wavelength The result of the launching technique in accordance with the principles of the present invention results in all wavelength components of the input optical beam occurring at the output of optical fiber transmission line at the same time.

Referring to FIG. 4, there is illustrated therein one arrangement for carrying out the method in accordance with the principles of the present invention which includes an optical source 1, which may be a solid state laser or light emitting diode. The plane wave front of the light beam produced by source 1 is optically coupled to the annularly ruled transmission grating 2 wherein the annular ruling 3 passes the highest wavelength components of the beam of source 1 and the annular ruling 4 passes the shortest wavelength of the optical beam of source 1. Intermediate annular rulings 3 and 4 are a plurality of other annular rulings 5 to pass the wavelength components of the beam of source 1 intermediate the longest and shortest wavelengths with the spacing between the annular rulings 3, 4 and 5 being varied so as to provide a time of flight dependence transmission grating with the variable rulings spacings being appropriately selected to produce the desired equalization. The components of the optical beam passing through transmission grating 2 are focused by a lens system 6 upon the input of an optical transmission line 7, such as a step index or other non-self-focusing optical fiber. It will be noted that due to the transmission grating 2, the shortest wavelength component of the optical beam having magnitude $\lambda_1$ are reconstructed on fiber 7 in an annulus of cone angle $\theta_1$ and the longest wavelength component of the optical beam having a magnitude of $\lambda_2$ is reconstructed on optical transmission line 7 in a cone angle of $\theta_2$. The wavelength components intermediate the longest and shortest wavelength components are reconstructed on the optical transmission line having a cone angle between $\theta_1$ and $\theta_2$. The path length from source 1 to transmission line 7 in each instance (path #1 and path #2 as illustrated) having length differential corresponding to a time of flight differential $\Delta T$. By adjusting the magnitude of this difference by appropriately varying the spaces of the annular rulings of transmission grating 2 between annular rulings 3 and 4, the desired equalization of the dispersion effect of the optical fiber transmission line is produced.

Referring to FIG. 5, a second embodiment of an arrangement to launch the different wavelengths of optical beam into the optical transmission line 7 is illustrated. The optical source 1 can be of the same type of elements as FIG. 1 and the lens system 6 is provided as in the embodiment of FIG. 4 to focus the rays of various wavelengths present in the optical beam for source 1 after passing through the time of flight dependent grating into the optical transmission line 7. The difference between the embodiment of FIG. 4 and the embodiment of FIG. 5 is that the time of flight dependent transmission grating is provided by a moving acoustic wave 8 having a spatial frequency versus length characteristic $d(x)$ passing through the optical beam of source 1. A wavelength $\lambda$ is made to deflect an angle $\theta$ given by the following formula $$n = \frac{d(x)}{\lambda} \sin \theta,$$

where $n$ is equal to 1, 2 ... Since at a given point $d(x) = d(t)$, where $d(t)$ is equal to the time for the acoustic wave to pass a given point, the deflection or launching angle is given as a function of $\lambda(t)$ and may be adjusted to equalize the dispersion effect of the optical transmission line 7. A convenient way of producing the moving acoustic wave of characteristic $d(x)$ is by pulsing an acoustic surface wave dispersive delay line 9 with a voltage pulse from source 10.

While we have described above the principles of our invention in connection with specific apparatus it is to be clearly understood that this description is made only by way of example and not as a limitation to the scope of our invention as set forth in the objects thereof and in the accompanying claims.

We claim:

1. A method of equalizing dispersion effects in an optical fiber transmission line having a given delay characteristic for each optical wavelength propagated therethrough comprising the step of:

producing a predetermined delay characteristic by an optical delay means disposed adjacent an input of said optical fiber transmission line for each wavelength of an optical beam having a finite bandwidth which is the inverse to said given delay characteristic of said transmission line, each of said wavelengths of said optical beam in said optical delay means having only one narrow range of selected angles with the axis of said optical fiber transmission line.

2. A method according to claim 1, wherein said step of producing includes the steps of launching shorter wavelength components of said beam at low angles with respect to the axis of said transmission line into said transmission line, and launching longer wavelength components at high angles with respect to the axis of said transmission line into said transmission line.

3. A method according to claim 2, wherein both of said launching steps include the step of passing said optical beam through a time of flight dependent transmission grating.

4. A method according to claim 2, wherein both of said launching steps include the step of passing said optical beam through an annularly ruled transmission grating.

5. A method according to claim 2, wherein both of said launching steps include the step of passing said optical beam through a moving acoustic wave having a selected spatial frequency versus length characteristic.

6. An arrangement for equalizing dispersion effects on an optical beam having a finite bandwidth by an optical fiber transmission line comprising:

means for producing an optical beam having a finite bandwidth, and an optical delay means optically coupled between said means for producing and an input of said optical fiber transmission line to launch shorter wavelength components of said beam at low angles with respect to the axis of said transmission line into said transmission line and to launch longer wavelength components of said beam at high angles with respect to the axis of said transmission line into said transmission line, each of said wavelength components of said optical beam in said delay means having only one narrow range of selected angles with respect to the axis of said transmission line.

7. An arrangement according to claim 6, wherein said means for producing includes a solid state laser.

8. An arrangement according to claim 7, wherein said delay means includes a time of flight dependent transmission grating means and a lens system disposed between said delay means and said input of said transmission line.

9. An arrangement according to claim 8, wherein said grating means includes
an annularly ruled transmission grating.

10. An arrangement according to claim 9, wherein said annularly ruled transmission grating includes
a first annular ruling to pass the shortest wavelength component of said optical beam,
a second annular ruling to pass the longest wavelength component of said optical beam, and
a plurality of spaced annular rulings disposed between said first and second annular rulings to pass wavelength components of said optical beam intermediate the shortest and longest wavelength components of said optical beam.

11. An arrangement according to claim 10, wherein the spacing of said plurality of annular rulings is varied in a predetermined manner.

12. An arrangement according to claim 8, wherein said grating means includes
a means to generate a moving acoustic wave having a predetermined spatial frequency versus length characteristic for passing through said optical beam.

13. An arrangement according to claim 12, wherein said means to generate includes
an acoustic surface wave dispersive delay line, and
a voltage pulse source coupled to said delay line for actuation thereof.

14. An arrangement according to claim 6, wherein said means for producing includes
a light emitting diode.

15. An arrangement according to claim 14, wherein said delay means includes
a time of flight dependent transmission grating means and a lens system disposed between said delay means and said input of said transmission line.

16. An arrangement according to claim 15, wherein said grating means includes
an annularly ruled transmission grating.

17. An arrangement according to claim 16, wherein said annularly ruled transmission grating includes
a first annular ruling to pass the shortest wavelength component of said optical beam,
a second annular ruling to pass the longest wavelength component of said optical beam, and
a plurality of spaced annular rulings disposed between said first and second annular rulings to pass wavelength components of said optical beam intermediate the shortest and longest wavelength components of said optical beam.

18. An arrangement according to claim 17, wherein the spacing of said plurality of annular rulings is varied in a predetermined manner.

19. An arrangement according to claim 15, wherein said grating means includes
a means to generate a moving acoustic wave having a predetermined spatial frequency versus length characteristic for passing through said optical beam.

20. An arrangement according to claim 19, wherein said means to generate includes
an acoustic surface wave dispersive delay line, and
a voltage pulse source coupled to said delay line for actuation thereof.

21. An arrangement according to claim 6, wherein said delay means includes
a time of flight dependent transmission grating means and a lens system disposed between said delay means and said input of said transmission line.

22. An arrangement according to claim 21, wherein said grating means includes
an annularly ruled transmission grating.

23. An arrangement according to claim 22, wherein said annularly ruled transmission grating includes
a first annular ruling to pass the shortest wavelength component of said optical beam,
a second annular ruling to pass the longest wavelength component of said optical beam, and
a plurality of spaced annular rulings disposed between said first and second annular rulings to pass wavelength components of said optical beam intermediate the shortest and longest wavelength components of said optical beam.

24. An arrangement according to claim 23, wherein the spacing of said plurality of annular rulings is varied in a predetermined manner.

25. An arrangement according to claim 21, wherein said grating means includes
a means to generate a moving acoustic wave having a predetermined spatial frequency versus length characteristic for passing through said optical beam.

26. An arrangement according to claim 25, wherein said means to generate includes
an acoustic surface wave dispersive delay line, and
a voltage pulse source coupled to said delay line for actuation thereof.

* * * * *